(12) United States Patent
Kanter

(10) Patent No.: US 9,085,909 B2
(45) Date of Patent: Jul. 21, 2015

(54) PROTECTIVE FLOORING SYSTEM

(76) Inventor: Ray D. Kanter, San Antonio, TX (US)

(*) Notice: Subject to any disclaimer, the term of this patent is extended or adjusted under 35 U.S.C. 154(b) by 0 days.

(21) Appl. No.: 13/008,892

(22) Filed: Jan. 18, 2011

(65) Prior Publication Data
US 2011/0197531 A1 Aug. 18, 2011

Related U.S. Application Data

(60) Provisional application No. 61/295,922, filed on Jan. 18, 2010.

(51) Int. Cl.
*E04F 15/22* (2006.01)
*B32B 5/18* (2006.01)

(52) U.S. Cl.
CPC .. *E04F 15/22* (2013.01); *B32B 5/18* (2013.01)

(58) Field of Classification Search
CPC ............ B32B 5/18; B32B 3/00; B32B 15/08; B32B 7/12; B32B 21/047; E04F 15/02; E04F 15/18; E04F 15/22
USPC .............. 52/403.1, 211, 212, 177, 480, 309.4
See application file for complete search history.

(56) References Cited

U.S. PATENT DOCUMENTS

| | | | | | |
|---|---|---|---|---|---|
| 2,140,902 | A | * | 12/1938 | Fischer | 4/581 |
| 3,083,393 | A | * | 4/1963 | Nappi | 15/215 |
| 3,446,122 | A | * | 5/1969 | Unterstenhoefer et al. | 404/28 |
| 3,577,894 | A | * | 5/1971 | Emerson et al. | 404/31 |
| 3,586,598 | A | * | 6/1971 | Beemer | 428/95 |
| 3,765,972 | A | * | 10/1973 | Wesp | 156/71 |
| 4,073,998 | A | * | 2/1978 | O'Connor | 442/55 |
| 4,075,377 | A | * | 2/1978 | Aitchison et al. | 428/95 |
| 4,292,369 | A | * | 9/1981 | Ohashi et al. | 428/317.5 |
| 4,356,642 | A | * | 11/1982 | Herman | 36/44 |
| 4,415,620 | A | * | 11/1983 | Yamazaki et al. | 428/157 |
| 4,438,166 | A | * | 3/1984 | Gluck et al. | 428/113 |
| 4,479,280 | A | * | 10/1984 | Yamazaki et al. | 15/217 |
| 4,609,580 | A | * | 9/1986 | Rockett et al. | 428/198 |
| 4,822,669 | A | * | 4/1989 | Roga | 442/373 |
| 4,824,498 | A | * | 4/1989 | Goodwin et al. | 156/71 |
| 5,028,468 | A | * | 7/1991 | Taylor | 428/71 |
| 5,085,424 | A | * | 2/1992 | Wood, Jr. | 472/92 |
| 5,114,774 | A | * | 5/1992 | Maxim, Jr. | 428/101 |
| 5,116,439 | A | * | 5/1992 | Raus | 156/71 |
| 5,173,346 | A | * | 12/1992 | Middleton | 428/53 |
| 5,183,438 | A | * | 2/1993 | Blom | 472/92 |
| 5,236,753 | A | * | 8/1993 | Gaggero et al. | 428/43 |
| 5,242,750 | A | * | 9/1993 | Wagner et al. | 428/316.6 |
| 5,274,846 | A | * | 1/1994 | Kolsky | 2/460 |
| 5,411,352 | A | * | 5/1995 | Eren | 404/31 |
| 6,090,462 | A | * | 7/2000 | Kanter | 428/40.1 |
| 6,093,469 | A | * | 7/2000 | Callas | 428/95 |
| 6,096,416 | A | * | 8/2000 | Altenberg | 428/317.7 |
| 6,164,031 | A | * | 12/2000 | Counihan | 52/480 |
| 6,258,202 | B1 | * | 7/2001 | Callas | 156/293 |
| 6,489,037 | B1 | * | 12/2002 | Phillips et al. | 428/511 |
| 6,526,704 | B1 | * | 3/2003 | Berard et al. | 52/177 |

(Continued)

*Primary Examiner* — James Ference
(74) *Attorney, Agent, or Firm* — Krueger Iselin LLP

(57) ABSTRACT

A flooring system includes a foam pad having an upper surface and a lower surface, and having a tapered section having a slope. The flooring system also includes a coating of a primer material disposed upon at least the slope of the tapered section of the upper surface of the foam pad. A coating of an adhesive is disposed upon at least the coating of the primer material. The flooring system also includes a covering where at least a portion of a surface of the covering is in contact with the coating of adhesive.

19 Claims, 3 Drawing Sheets

(56) References Cited

U.S. PATENT DOCUMENTS

| | | | |
|---|---|---|---|
| 6,572,952 B1 * | 6/2003 | Kanter | 428/192 |
| 6,599,599 B1 * | 7/2003 | Buckwater et al. | 428/40.1 |
| 6,689,239 B1 * | 2/2004 | Grubic | 156/71 |
| 6,786,674 B1 * | 9/2004 | Hanks | 404/32 |
| 6,796,096 B1 * | 9/2004 | Heath | 52/403.1 |
| 6,803,110 B2 * | 10/2004 | Drees et al. | 428/423.7 |
| 7,127,857 B2 * | 10/2006 | Randjelovic | 52/403.1 |
| 7,192,631 B2 * | 3/2007 | Polley | 428/68 |
| 7,193,179 B2 * | 3/2007 | Horvath et al. | 219/212 |
| 7,291,376 B1 * | 11/2007 | Siegel et al. | 428/99 |
| 7,361,694 B2 * | 4/2008 | Strandburg et al. | 521/61 |
| 7,445,833 B2 * | 11/2008 | Polley | 428/178 |
| 7,546,707 B1 * | 6/2009 | DiGennaro | 52/177 |
| 7,575,796 B2 * | 8/2009 | Scott et al. | 428/120 |
| 2002/0071927 A1 * | 6/2002 | Kessler et al. | 428/44 |
| 2002/0088193 A1 * | 7/2002 | Reimers et al. | 52/403.1 |
| 2003/0068463 A1 * | 4/2003 | Polley | 428/71 |
| 2003/0124337 A1 * | 7/2003 | Price et al. | 428/317.3 |
| 2003/0152761 A1 * | 8/2003 | McCune | 428/319.3 |
| 2003/0219570 A1 * | 11/2003 | Kanter | 428/157 |
| 2004/0040242 A1 * | 3/2004 | Randjelovic | 52/403.1 |
| 2005/0192365 A1 * | 9/2005 | Strandburg et al. | 521/50 |
| 2006/0019083 A1 * | 1/2006 | Giogetta | 428/304.4 |
| 2006/0172122 A1 * | 8/2006 | Polley | 428/178 |
| 2006/0179752 A1 * | 8/2006 | Swanson et al. | 52/403.1 |
| 2006/0211781 A1 * | 9/2006 | Strandburg et al. | 521/74 |
| 2007/0062139 A1 * | 3/2007 | Jones et al. | 52/403.1 |
| 2007/0094786 A1 * | 5/2007 | Smith et al. | 4/581 |
| 2007/0225389 A1 * | 9/2007 | Strandburg et al. | 521/65 |
| 2007/0244209 A1 * | 10/2007 | Strandburg et al. | 521/142 |
| 2007/0275207 A1 * | 11/2007 | Higgins et al. | 428/95 |
| 2008/0000581 A1 * | 1/2008 | Nison et al. | 156/272.2 |
| 2008/0178547 A1 * | 7/2008 | Kanter et al. | 52/403.1 |
| 2008/0275151 A1 * | 11/2008 | Strandburg et al. | 521/143 |
| 2009/0178364 A1 * | 7/2009 | Uhlig | 52/718.04 |
| 2009/0293398 A1 * | 12/2009 | Eren | 52/403.1 |
| 2009/0305849 A1 * | 12/2009 | Weller | 482/26 |

\* cited by examiner

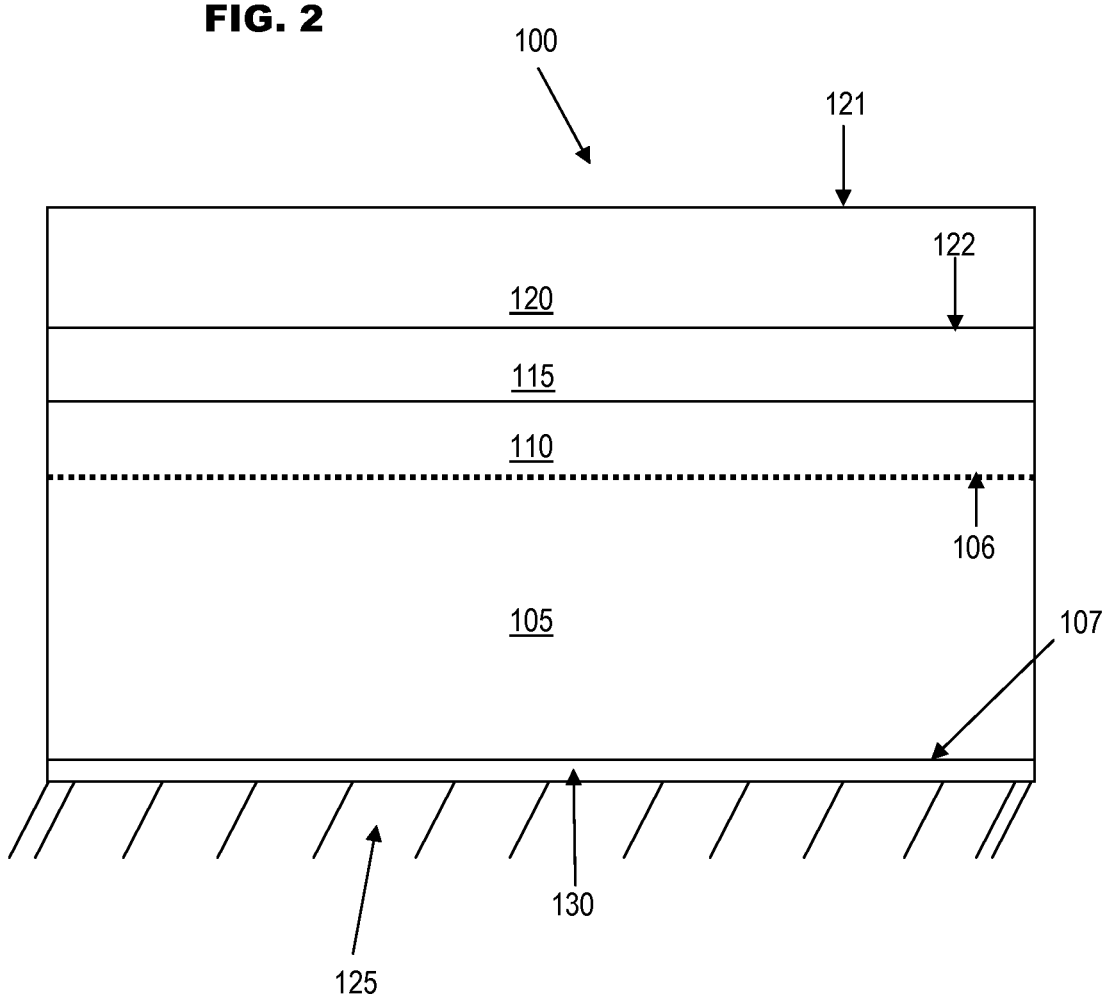

PROTECTIVE FLOORING SYSTEM

RELATED APPLICATIONS

This application claims priority to U.S. Provisional Patent Application No. 61/295,922 entitled "Rubber Protective Surface System" by Ray D. Kanter filed Jan. 18, 2010, which is incorporated by reference in its entirety.

FIELD OF THE INVENTION

The present disclosure relates generally to a safety flooring system. More specifically, the present disclosure relates to a protective flooring system having a rubber protective surface system.

DESCRIPTION OF THE RELATED ART

Prior safety mats used to cover the flooring at children's play areas or hospital floors are general known. Such flooring may meet the requirements of ASTM F-1292 Standard Specification for Impact Attenuation of Surface Systems Under and Around Playground Equipments. Examples include those disclosed in earlier patent documents naming the instant inventor, such as U.S. Pat. No. 6,090,462 titled "Shock Absorbing Carpet System," U.S. Pat. No. 6,572,952B1 titled "Shock Absorbing Carpet System," U.S. Patent Publication US2003/0219570A1 titled "Shock Absorbing Carpet System," and U.S. Patent Publication US2008/0178547A1 titled "Shock Absorbing Floor Covering System," all of which are incorporated by reference in their entireties.

SUMMARY OF THE INVENTION

In accordance with the illustrative embodiments hereinafter described, a flooring system may include a flooring system including a foam pad having an upper surface and a lower surface, and having a tapered section having a slope. The flooring system also includes a coating of a primer material disposed upon at least the slope of the tapered section of the upper surface of the foam pad. A coating of an adhesive is disposed upon at least the coating of the primer material. The flooring system also includes a covering where at least a portion of a surface of the covering is in contact with the coating of adhesive.

While the invention will be described in connection with illustrative embodiments, it will be understood that it is not intended to limit the invention to those embodiments. On the contrary, it is intended to cover all alternatives, modifications, and equivalents as may be included within the spirit and scope of the invention as defined by the appended claims.

BRIEF DESCRIPTION OF THE DRAWINGS

The present flooring system and method of installation may be understood by reference to the following description taken in conjunction with the accompanying drawing, in which certain features are exaggerated and/or presented in a not-to-scale schematic in the interest of clarify of understanding and simplicity:

FIG. 2 is a side view of an alternative embodiment of the present invention with a vapor barrier.

DETAILED DESCRIPTION

Figure 1A:
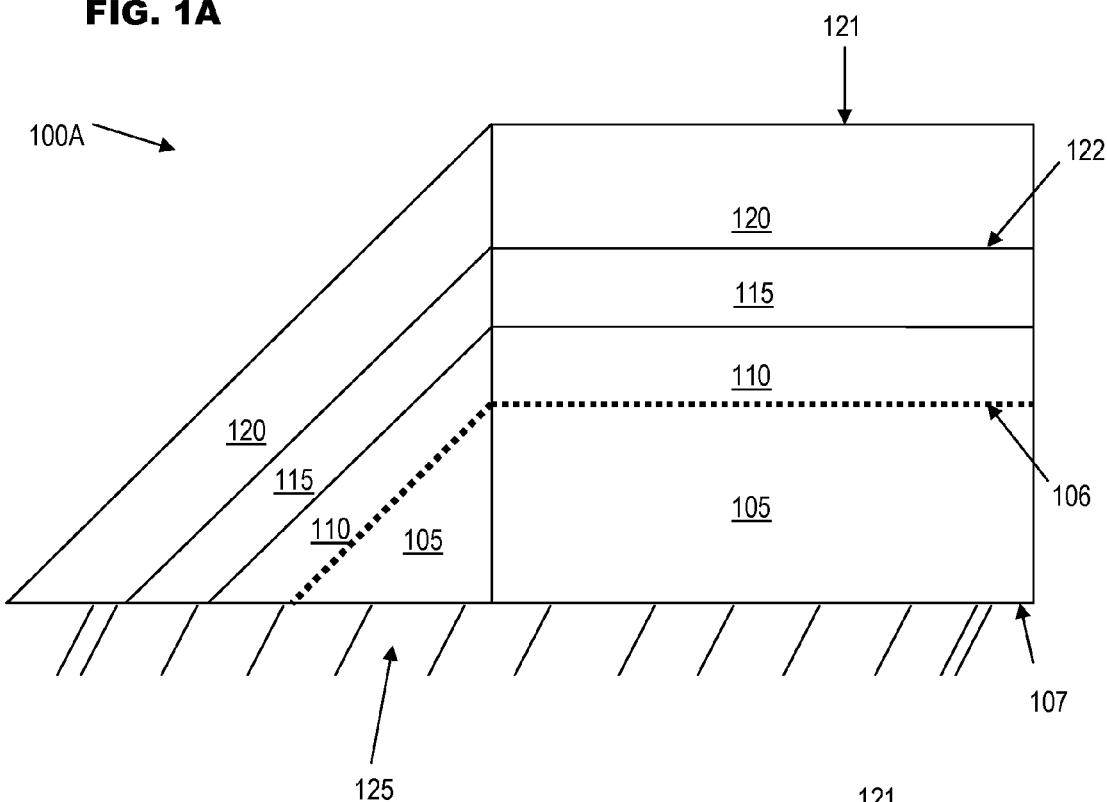
FIG. 1A is a side view of an illustrative embodiment of the present invention having primer on substantially all of the upper surface of the foam pad.
Figure 1B:
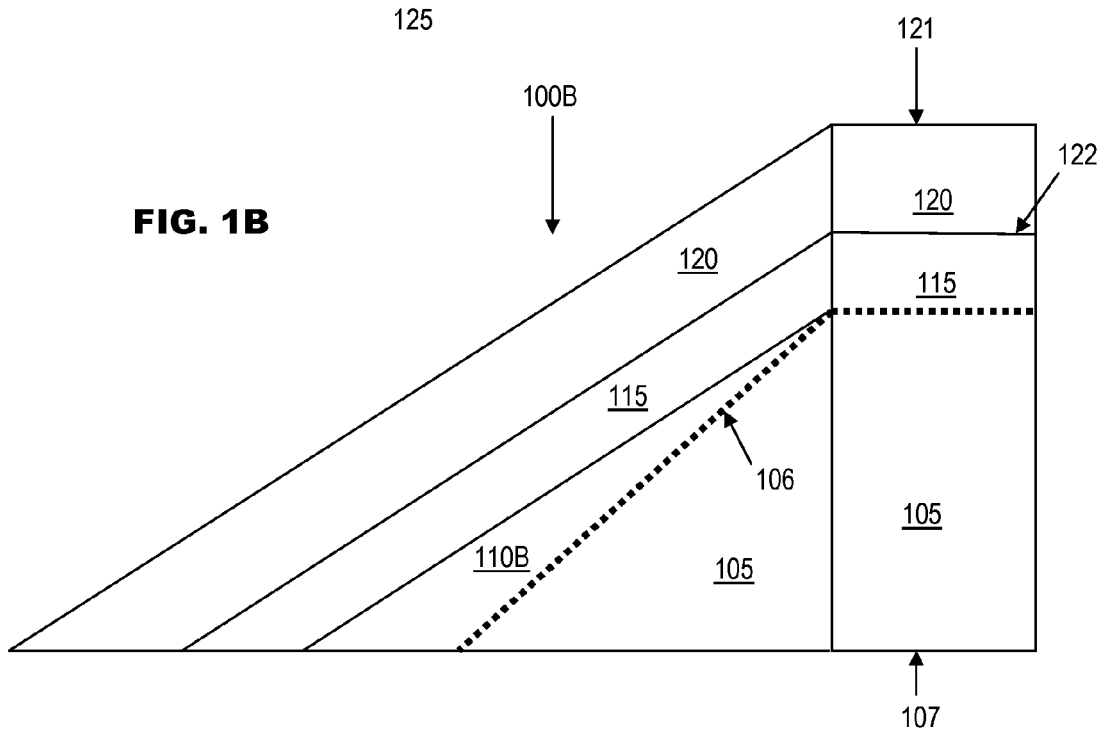
FIG. 1B is a side view of an illustrative embodiment of the present invention having primer on the upper surface of the foam pad on the slope.

With reference to FIG. 1A, a side view of an illustrative embodiment of the present flooring system 100A is shown. The flooring system 100A may generally include a foam pad 105; a primer material 110; an adhesive 115; and a rubber pad 120. The foam pad 105 may be formed substantially of a polyvinylchloride ("PVC"). In one embodiment, the foam pad 105 is formed of an elastomeric material comprised of closed cell foam having a density ranging from about 8 to about 18 pounds per cubic foot. The foam pad 105 may include an upper surface 106 and a lower surface 107. With reference to FIG. 1B, the lower surface 107 of the foam pad 105 may be affixed to a flooring 125, such as a concrete floor 125.

The foam pad 105 may be purchased in sheets or tiles. Generally, adjacent foam pad sheets or tiles may be heat or cold or chemically welded together or glued together. Note that the choice of material for the foam pad 105 is a design choice based on the ability of the flooring system 100 to meet the desired standard or safety level, such as the before mentioned ASTM standard or safety limits such as three foot fall protection, four foot fall protection, or six foot fall protection. The preferred embodiments are elastomeric closed cell foams. In various embodiments, the foam pad 105 is an elastomer blend.

Continuing with reference to FIG. 1A, the primer material 110 may be disposed upon at least one portion of the upper surface 106 of the foam pad 105. The firm primer material may be a solvent-free composition having a first part comprising about 60 wt. % first acrylate polymer, about 20 wt % calcium carbonate, and about 20 wt % resin, and a second part comprising about 90 wt % second acrylate polymer about 10 wt % epoxy resin hardener. Alternatively, the primer material may be ARDEX P 82, available from ARDEX Engineered Cements, located in Aliquippa, Pa. It is believed that in past flooring systems, which did not use the primer material 110, the adhesive 115 would seep into its associated foam pad, which could cause air pockets to form. These air pockets may reduce the adhesive bond. These air pockets may also lead to an uneven surface.

In one embodiment, a layer of the primer material 110 is coated, sprayed, or otherwise disposed, onto the upper surface 106 of the foam pad 105. In one embodiment, the entire upper surface 106 of the foam pad 105 may be covered with the primer material 110; such as shown in FIG. 1B. It is expected and reasonable that the primer material 100 may not coat the entire foam pad 105. In one embodiment, a substantial portion of the upper surface 106 of the foam pad 105 is coated, sprayed, or otherwise contacted with the primer material 110; alternatively, at least about 50% of the upper surface 106 of the foam pad 105 is coated, sprayed, or otherwise contacted with the primer material 110. In another embodiment, at least about 65% of the upper surface 106 of the foam pad 105 is coated, sprayed, or otherwise contacted with the primer material 110; alternatively, at least about 75% of the upper surface 106 of the foam pad 105 is coated, sprayed, or otherwise contacted with the primer material 110. In yet another embodiment, at least about 85% of the upper surface 106 of the foam pad 105 is coated, sprayed, or otherwise contacted with the primer material 110; alternatively, at least about 95% of the upper surface 106 of the foam pad 105 is coated, sprayed, or otherwise contacted with the primer material 110.

In one embodiment, the tapered section or ramped portion of the foam pad 105 may be cut or machined or processed to make the tapered section of the foam pad 105. This processed portion of the foam pad 105 may now have an area of the surface of the foam pad 105 that is not sealed. This unsealed area may allow adhesive to soak into the foam pad 105 in an undesirable way. In one embodiment, it is primarily or entirely this unsealed area of the foam pad 105 that is covered with the primer material 110. Those areas of the surface of the foam pad 105 that is sealed may not need the primer material 110 for proper adhesion. In one embodiment, the primer material 110 may still be used on the sealed areas of the surface of the foam pad 105.

The adhesive 115 may be layered, coated, sprayed, or otherwise disposed upon the primer material 110. The adhesive 115 may be a polyurethane adhesive, including a two part polyurethane adhesive. In another embodiment, the adhesive 115 is a contact adhesive. In one embodiment, the entire primer material 110 is covered with the adhesive 115. Alternatively, the adhesive 115 substantially covers the primer material 110 and further substantially contacts the upper surface 106 of the foam pad 105 at locations where the primer material 110 was not applied to the upper surface 106 of the foam pad 105. In one embodiment, a substantial portion of the primer material 110 is coated, sprayed, or otherwise contacted with the adhesive 115; alternatively, at least about 50% of the primer material 110 is coated, sprayed, or otherwise contacted with the adhesive 115. In another embodiment, at least about 65% of the primer material 110 is coated, sprayed, or otherwise contacted with the adhesive 115; alternatively, at least about 75% of the primer material 110 is coated, sprayed, or otherwise contacted with the adhesive 115. In still another embodiment, at least about 85% of the primer material 110 is coated, sprayed, or otherwise contacted with the adhesive 115; alternatively, at least about 95% of the primer material 110 is coated, sprayed, or otherwise contacted with the adhesive 115. The adhesive 115 may be applied at a rate of approximately 120 square feet per gallon.

The rubber pad 120 may be formed substantially of a non-polyvinylchloride ("non-PVC") rubber material. In an embodiment, the rubber pad 120 is a rubberized material having a thickness ranging in size from about 2 millimeters to about 4 millimeters, alternatively from about 2.5 millimeters to about 4 millimeters, and alternatively from about 2.95 millimeters to about 3.9 millimeters. In an embodiment, the rubber pad 120 may be formed of NORAPLAN ENVIRONCARE or GRANO, rubbers available from Nora Systems, Inc., a company having a branch office in Lawrence, Mass., USA. The rubber pad 120 may have a top surface 121 and a bottom surface 122. The bottom surface 122 of the rubber pad 120 may be associated with, or in contact with, the adhesive 115. In an embodiment, the bottom surface 122 of the rubber pad 120 is associated with, or in contact with, the adhesive 115, as well as the primer material 110.

In one embodiment, the bottom surface 122 of the rubber pad 120 is associated with, or in contact with, the adhesive 115, as well as the primer material 110 and the upper surface 106 of the foam pad 105. The rubber pad 120 may be purchased in sheets or tiles. Generally, adjacent rubber sheets or tiles may be heat or cold welded together. In one embodiment, the rubber pad 120 is non-porous, may be impervious to liquids, and may have chemical resistances.

Preferably, the flooring system 100 is sufficient to meet the criteria of standards ASTM F-1292 and/or ASTM E-648 as well as CPSC and ADA-ABA standards.

The rubber flooring system 100 may be comprised of a plurality of pre-shaped smaller pieces. In this manner, the rubber system 100 can be shaped in any configuration to cover the floor of an area. Adjacent pre-shaped pieces may be connected or affixed to each other by any suitable means, including Velcro, tape, glue, screws, pins, nails, staples, and the like. Further, the outer edges of the rubber system 100 may be ramped downwardly to avoid a tripping hazard. The ramp may have a slope ranging from about 1:13 to about 1:15, alternatively from about 1:5 to about 1:10, and alternatively from about 1:15 to about 1:24. Preferably, the ramped portion is of the same composition, i.e., foam pad 105, primer material 110, adhesive 115, and rubber pad 120, as the remainder of the rubber flooring system 100.

With reference to FIG. 2, a vapor barrier 130 may be applied to the floor 125. The vapor barrier 130 may be applied when the floor 125 is formed of concrete. The lower surface 107 of the foam pad 105 may be associated with, or in contact with the vapor barrier 130. As described above with respect to the primer layer 110, the vapor barrier 130 may not coat the entire portion of the floor 130. The vapor barrier 130 may have the same composition as the primer layer 110.

Figure 3:
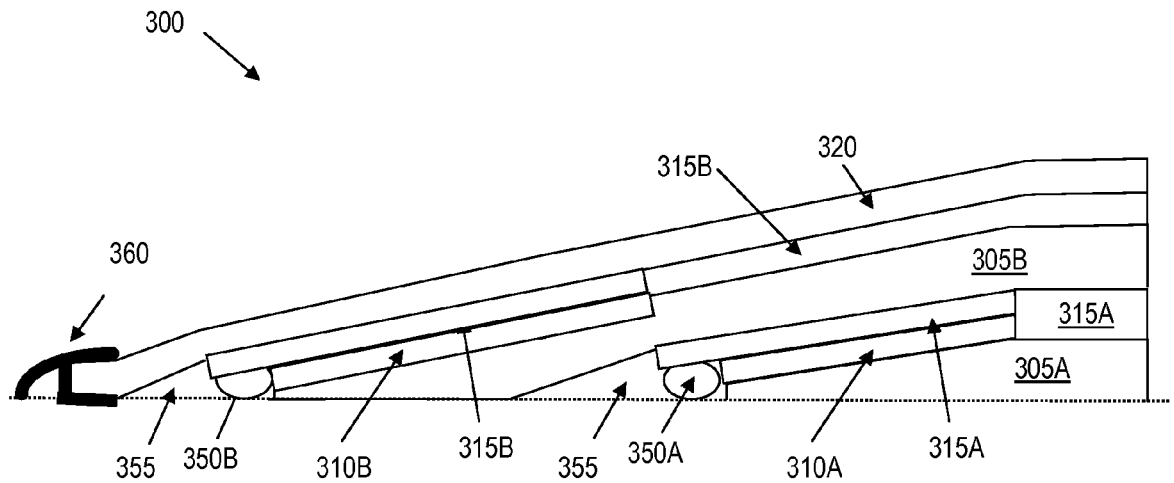
FIG. 3 is a side view of an alternative embodiment of the present invention with multiple foam pads.

Turning now to FIG. 3, similar items will use similar numbers so the descriptions of the earlier figures are incorporated without duplication. As illustrated, a flooring system 300 includes a first foam pad 305A including a tapered section having a slope. The slope is preferably greater than about 1:12, but other slopes are contemplated. The first foam pad 305A is shown in contact with a surface, which may be a floor 125, a vapor barrier 130, or another adhesive layer. On top of the first foam pad 305A, a first primer layer 310A covers at least a portion of the surface of the first foam pad 305A. In one embodiment, the portion of the surface of the first foam pad 305A may include the surface of the sloped, tapered section.

A first adhesive layer 315A is shown on top of the first foam pad 305A and the first primer layer 310A. A second foam pad 305B is associated with or in contact with the first adhesive layer 315A. Note the presence of a void 355 under the second foam pad 305B at the end of the first foam pad 305A and the void 355 at the end of the second foam pad 305B. A filler 350A and a filler 350B may be added to the voids 355 to fill part of the empty space. Adhesive layers 315 may be made thicker in this area to also fill the voids 355 to a certain extent.

In one embodiment, the fillers 350A/350B are composed of the same material as the first foam pad 305A and/or the second foam pad 305B. When the foam pads 305 are prepared with the tapered section, a minimum thickness of about ⅛$^{th}$ of an inch is possible. Stray ends and pieces are often attached to the edge, referred to as granules. In one embodiment, these granules are collected and used as fillers 350A/350B.

Note that the second foam pad 305B preferably extends past the end of the first foam pad 305A by a predetermined length. In this area, the details of FIG. 3 are most similar to those of the earlier figures. Note that the right end of FIG. 3 shows the full thickness and height of the flooring system 300. The sloping to the left illustrates the taper to the edge. Full height of the flooring system 300 is similar to aspects of FIG. 2, the figure without a taper shown.

As shown in FIG. 3, the second foam pad 305B includes a tapered section having a slope. The slope is preferably greater than about 1:12, but other slopes are contemplated. The second foam pad 305B is shown in contact with the first adhesive layer 315A and may also be in contact with the first primer layer 310A and/or the first foam pad 305A in some portions of the lower surface. On top of the second foam pad 305B, a second primer layer 310B covers at least a portion of the surface of the second foam pad 305B. In one embodiment, the portion of the surface of the second foam pad 305B may include the surface of the sloped, tapered section of the second foam pad 305B. In one embodiment, the first and second foam layers 305 are identical. In another embodiment, the first and second foam layers have different densities and therefore different compositions.

A second adhesive layer 315B is shown on top of the second foam pad 305B and the second primer layer 310B. A floor cover 320 is associated with or in contact with the second adhesive layer 315B. The floor cover 320 may be the rubber flooring 120 discussed above. In another embodiment, the floor cover 320 is an alternative flooring material, including carpet. As used herein, the term covering means a layer above another layer, such as the floor cover 320 above the second foam pad 305B. In other embodiments, the covering may be another layer of foam padding 305. Although FIG. 3 is shown with two layers of foam padding 305, in other embodiments, there may be more than two layers.

At the end of the top layer, the floor cover 320 in FIG. 3, the floor cover 320 extends a predetermined distance beyond the second foam pad 305B. In one embodiment, the predetermined distance is about one inch. In another embodiment, the predetermined distance is about two inches. In a preferred embodiment, the predetermined distance is at least the length required for the floor cover 320 to be substantially parallel to the surface on which the flooring system 300 rests. This allows the floor cover 320 to interact with the transition 360 in its proper configuration. Any suitable transition 360 known in the art may be used. The transition 360 is used to go from one type of flooring to another. This may be especially important with safety flooring systems.

Specific embodiments of the present rubber flooring system 100 have been described and illustrated. It will be understood to those skilled in the art that changes and modifications may be made without departing from the spirit and scope of the invention as defined by the following appended claims.

The invention claimed is:

1. A flooring system, comprising:
a foam pad having an upper surface and a lower surface, wherein the foam pad includes a tapered section having a slope;
a coating of a primer material disposed upon at least the slope of the tapered section of the upper surface of the foam pad, wherein the primer material is a solvent-free composition having a first part comprising 60 wt. % first acrylate polymer, 20 wt. % calcium carbonate, and 20 wt. % resin and a second part comprising 90 wt. % second acrylate polymer and 10 wt. % epoxy resin hardener;
a coating of an adhesive disposed upon at least the coating of the primer material; and
a covering, wherein at least a portion of a surface of the covering is in contact with the coating of adhesive.

2. The flooring system of claim 1, wherein the lower surface of the foam pad contacts a vapor barrier.

3. The flooring system of claim 1, wherein the lower surface of the foam pad contacts a floor.

4. The flooring system of claim 1, wherein the covering extends a predetermined length beyond the tapered section of the foam pad.

5. The flooring system of claim 4, further comprising:
a filler disposed at the end of the tapered section of the foam pad where the covering meets the surface on which the foam pad rests.

6. The flooring system of claim 4, wherein the covering is a second foam pad.

7. The flooring system of claim 6, wherein the foam pad and the second foam pad have different densities.

8. The flooring system of claim 4, wherein the covering is a floor cover.

9. The flooring system of claim 8, further comprising:
a transition piece coupled to an edge of the floor cover.

10. A flooring system comprising:
a foam pad having an upper surface and a lower surface, wherein the foam pad includes a tapered section having a slope with a ratio not greater than 1:12;
a coating of a primer material disposed upon at least one portion of the upper surface of the foam pad, wherein the primer material is a solvent-free composition having a first part comprising 60 wt. % first acrylate polymer, 20 wt. % calcium carbonate, and 20 wt. % resin and a second part comprising 90 wt. % second acrylate polymer and 10 wt. % epoxy resin hardener;
a coating of an adhesive disposed upon the coating of the primer material and disposed upon a remaining upper surface of the foam pad without the coating of the primer material; and
a rubber pad having a top surface and a bottom surface, the bottom surface of the rubber pad associated with the coating of the adhesive, wherein the rubber pad extends a predetermined length beyond the end of the foam pad.

11. The flooring system of claim 10, further comprising:
a filler disposed at the end of the tapered section of the foam pad where the rubber pad meets the surface on which the foam pad rests.

12. The flooring system of claim 10, further comprising:
a transition piece coupled to an edge of the rubber pad.

13. The flooring system of claim 10, wherein the lower surface of the foam pad contacts a vapor barrier.

14. The flooring system of claim 10, wherein the lower surface of the foam pad contacts a floor.

15. A flooring system, comprising:
a foam pad having an upper surface and a lower surface, wherein the foam pad includes a tapered section having a slope;
a coating of a primer material disposed upon at least one portion of the upper surface of the foam pad where the upper surface of the foam pad does not have a sealed surface, wherein the primer material is a solvent-free composition having a first part comprising 60 wt. % first acrylate polymer, 20 wt. % calcium carbonate, and 20 wt. % resin and a second part comprising 90 wt. % second acrylate polymer and 10 wt. % epoxy resin hardener;
a coating of an adhesive disposed upon at least a portion of the coating of the of the primer material and at least a portion of the upper surface of the foam pad; and
a rubber pad having a top surface and a bottom surface, the bottom surface of the rubber pad associated with the coating of the adhesive.

16. The flooring system of claim 15, wherein the top surface of the rubber pad and a bottom surface of the rubber pad are separated by a thickness of between 2 millimeters to 4 millimeters.

17. The flooring system of claim 15, wherein the adhesive is a polyurethane two part adhesive.

18. The flooring system of claim 15, wherein the foam pad is an elastomeric foam pad with a density between 8 and 18 pounds per cubic foot.

19. The flooring system of claim 15, further comprising:
a transition piece affixed to an edge of the rubber pad.

* * * * *